United States Patent [19]

Manno

[11] Patent Number: 4,585,365

[45] Date of Patent: Apr. 29, 1986

[54] POST AND BEAM CONSTRUCTION

[76] Inventor: Joe Manno, 5720 Oberlin Dr., San Diego, Calif. 92121

[21] Appl. No.: 604,899

[22] Filed: Apr. 27, 1984

[51] Int. Cl.[4] ............ F16B 12/12; A47B 3/06; E04G 9/00
[52] U.S. Cl. .................................... 403/6; 403/10; 403/231; 108/153; 248/188
[58] Field of Search ............ 108/153, 152, 156, 159, 108/157; 211/182; 248/188, 177; 403/6, 10, 231

[56] References Cited

U.S. PATENT DOCUMENTS

| | | | |
|---|---|---|---|
| 753,034 | 2/1904 | Behn | 108/156 |
| 3,129,965 | 4/1964 | Stark | 211/182 |
| 4,169,573 | 10/1979 | Frieberg | 248/188 |

Primary Examiner—William E. Lyddane
Assistant Examiner—Gerald A. Anderson
Attorney, Agent, or Firm—Ralph S. Branscomb

[57] ABSTRACT

A technique of construction is disclosed utilizing a plurality of upright posts bored from the top to define a bore that is coaxial with the post, there being cutaway portions entering into the sides of the post and communicating with the coaxial bore. A plurality of beams each has a tongue at both ends, the tongues fitting within the cutaway portions and being secured within the coaxial bore in the respective post. This securing is done with pins which are driven down into detent bores in the ends of the tongues, and the entire coaxial bore and pin and tongue detent structure is hidden by virtue of an overlying cap which is a press-fit into the coaxial bore, defining a flush surface with the top of the post.

1 Claim, 7 Drawing Figures

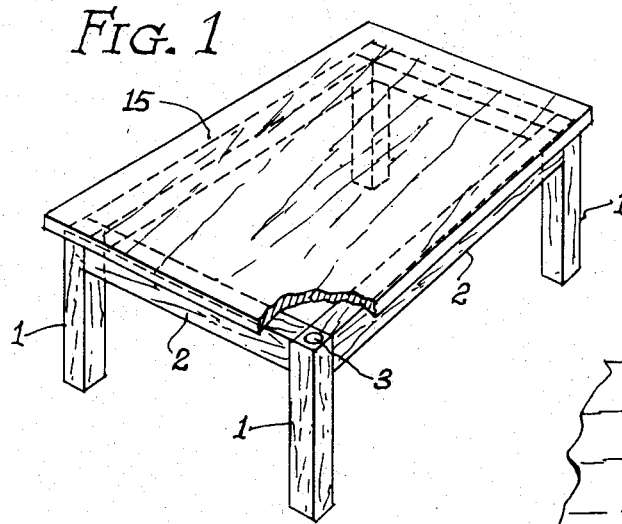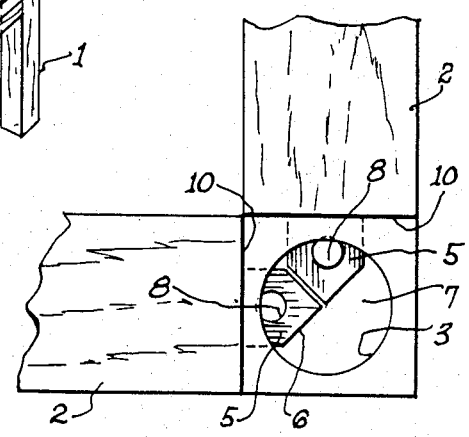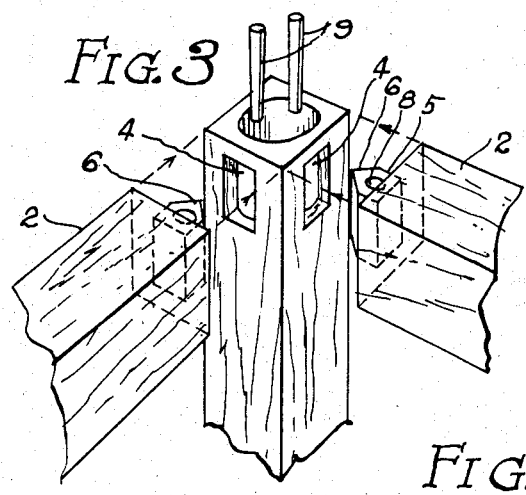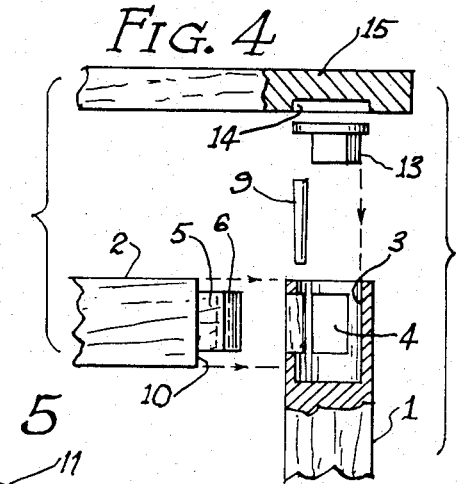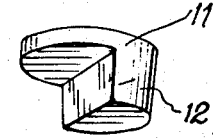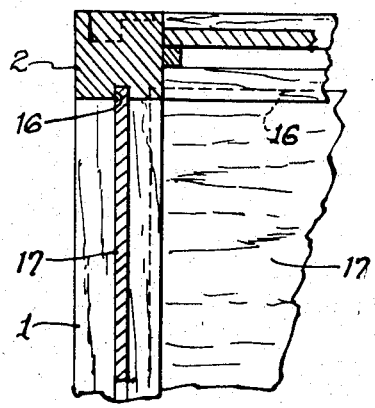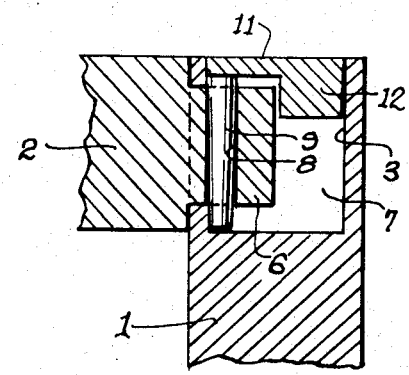

POST AND BEAM CONSTRUCTION

BACKGROUND OF THE INVENTION

The invention is in the field of furniture construction, and more particularly pertains to furniture construction wherein nails, screws, or other metallic parts are not used.

The invention was inspired in the tropics, where the inventor found that virtually irrespective of the coating that was put on the metal fittings that came with furniture, the hinges, corner fittings, screws, nails, mounting brackets, and other metal parts very quickly began to rust and corrode. As a result, within six months to a year's time, the furniture would be discolored in spots, and old-looking. In the event that fasteners were used to hold the parts together, the furniture would become rickety, and in a short time unsafe for use.

There is a need for a simple construction whereby three-member orthogonal joints could be created without the use of screws or nails. Once this type of joint had been perfected, the joint could be replicated, to produce any box-shaped piece of furniture, such as tables, chests, bedframes, and chairs.

The instant invention fulfills the above stated need by providing a three-member orthogonal joint which is totally hidden from view when completed, and which requires no metallic fittings of any type. Essentially, the construction is based around a plurality of posts which have bores into the tops of diameter nearly as great as the post, but retaining sufficiently strong side walls around the bore to engage and hold the tongues of a plurality of horizontally extending beams. The tongues of these beams extend through cutaways in the side of the posts such that the tongues extend into the vertical bore in the top of the post.

Each tongue has a vertical detent bore which is used to securely lock the tongue inside the main post bore by means of a dowel pin driven down through the tongue so that the ends of the dowel pin butt sideways against the periphery of the main coaxial bore in the post. The beams may enter the main coaxial bore in numbers of one, two, three, or four in the preferred embodiment, and with modifications of the angular spacings of the cutaway portions, a cartwheel shape, or other imaginative configurations could be created.

Once the dowel pins have been driven through the tongues to secure them and their attached beams to the end of the post, a cap having a depending semi-circular plug (speaking now of the two-beam version) is press fitted down into the top of the large vertical bore so that the depending semi-cylindrical portion slips down into the semi-cylindrical cavity remaining in the main bore after the two tongues of orthogonally extending beams have been pegged into place.

Although the beams and posts could be provided with grooves, ledges, and other structure for confining and supporting glass, wood panels, and any other structure required to create tables, boxes, etc., a typical embodiment has been illustrated in which a coffee table top is positioned atop a four-leg, four-beam structure, with the planar table top being counter-bored at the four corners to provide seats for the upwardly extending, specially made caps utilized in the coffee table configuration.

BRIEF DESCRIPTION OF THE DRAWINGS

FIG. 1 is an isometric view illustrating a coffee table-type construction as one example of the type of furniture that can be created by the instant assembly;

FIG. 2 is a top plan view illustrating two beams in place, with the dowel pins pressed into the tongues;

FIG. 3 is an exploded perspective illustrating the way in which the tongues, post, and dowel pins come together;

FIG. 4 is an exploded elevation view illustrating the construction of the table of FIG. 1 at one corner;

FIG. 5 is an isometric view of the cap with its semi-truncated cone or semicylindrical depending plug;

FIG. 6 illustrates a joint having grooved beams to mount panels; and

FIG. 7 is a section taken through the main bore illustrating the flush fitting of the cap into the top of the bore, seated on top of the pegs.

DETAILED DESCRIPTION OF THE PREFERRED EMBODIMENT

As shown in FIG. 1, the instant invention is provided in basically two parts, a series of upright posts 1, and horizontally extended beams 2. The beams and posts of the preferred embodiment are square in cross-section, and in fact are identical to one another except in the way in which the end fittings cooperate.

As shown in FIG. 2, each of the upright posts have a large coaxial bore 3 entrant therein from the top. As best shown in FIG. 3, each of the posts of the illustrated embodiment also has a pair of cutaway portions 4 in the form of rectangles, which pass through the wood of the top of the post, and communicate with the open bore or cavity 3. A couple of points should be noted here. First, the post need not be square or rectangular, and could be any shape whatsoever, provided the beams are adapted accordingly. Second, the cutaways 4, shown as being orthogonally oriented in FIG. 3, could be on one, two, three, or four sides of the square post in the drawing, and could also be provided in other numbers, in orientations other than orthogonal, on square posts, or posts of other cross-sectional configuration. Triangular, hexangonal, circular, and octagonal posts could be provided, with the cutaways provided in any number desired.

The beams each have, on each end, an extended tongue 5 which in the preferred embodiment is rectangular in cross-section to fit snugly within the cutaway 4, also rectangular in cross-section. The tip of the tongue tapers into an orthogonal, vertical edge 6. This edge is orthogonal in the horizontal plane and as can be seen in FIG. 2, when two orthogonal beams are inserted through their respective cutaways, the tongues will both fit within the main bore 3, and define a semi-cylindrical cavity 7, which could be occupied by two other beams inserted through cutaways put in the other two sides of the post, if desired.

Each of the tongues has a strategically positioned vertical detent bore 8. As shown in FIG. 2, these bores are ever so slightly offset from the tangential from the main bore 3 so that when the dowel pins 9, illustrated in FIGS. 3 and 4, are driven down through the detent bores, they tightly draw the beams, each of which has a shoulder 10 surrounding the tongue, up against the top of the post.

The length of the pins 9 is such that when completely driven down through the detent bores, they provide adequate clearance between their tops and the surface of the posts, and beams connected to the posts, to permit the flat portion of the cap 11 to rest on the pins and still define a flush top with the top of the post as shown in FIG. 7. In the embodiment illustrated, the cap has a depending plug 12, which is described and claimed as semi-cylindrical, but actually preferably has a slight taper so that technically speaking it is a semi-truncated cone. This semi-cylinder fits down into the cavity 7 defined by the interior walls of the bore 3 and the two tongues fitting in the cavity. Although the taper of the "semi-cylinder" is exaggerated, it would be enough to permit a flush fit to be achieved by pressing the cap inside the bore.

The illustrative coffee table shown in FIG. 1 utilizes four such joints, each of which is identical to the other. The construction differs from that in FIG. 7 in that the cap 13 which is used, cooperates with the dowel pins such that the cap extends above the top surface of the posts and beams enough so that it will seat in the counterbores 14 of the overlying, planar coffee table top 15. The planar top is securely held up by the beams which stand between adjacent posts, and the seating of the counterbores on the tops of the caps 13 insures that there is no lateral translation.

FIG. 6 illustrates diagrammatically the manner in which the basic stick construction illustrated can be converted into solid-panel furniture. In FIG. 6, grooves 16 seat the edges of panels such as those indicated at 17. The panels of course would be inserted as the joints are being assembled, and it is assumed that in FIG. 6 that each panel would have a beam or post on every edge, so that the panel would be completely captured. This type of construction would make a box or bed frame, a table with enclosed sides, or any other enclosed boxlike configuration.

Certain modifications need to be noted. First, clearly the bores 3 need not be cylindrical, but could be square, hexagonal, or it could reflect the cross-sectional shape of the exterior of the post in which it is bored. Also, although the bore is shown as being in the end (top) of each of the posts in the illustrations, it could as well be in one side, where one of the cutaways 4 is in the illustrations. This would permit two beams to be joined, one as a continuation of the other, with the cap being on the side, perhaps underneath a tabletop, to define an uninterrupted, flush post top continuing the contours of the beams extending on either side.

As thus disclosed and claimed, the instant invention provides an ideal joint which is simple to construct and versatile enough to connect any number of converging beams and posts in a variety of configurations limited only bt the imagination. In addition to the versatility and variety of configurations achievable, all construction is done completely without the use of any metal parts, including nails, screws, hinges, and other fittings. The construction is ideal not only from a utilitarian standpoint in climates having high humidity and subjecting all metallic articles to rapid corrosion, but is also esthetically clean and modern, presenting a finished, professional appearance.

While a specific embodiment of the disclosed invention has been illustrated and described, various modifications and changes may be made without departing from the spirit and scope of the invention.

I claim:

1. An all-wood, three dimensional post and beam construction comprising:
    (a) a wooden post defining a longitudinal axis;
    (b) a coaxial bore defined into one end of said post and being accessible externally of said post;
    (c) a pair of cutaways defined into said post, said cutaways being entrant through said post into communication with said cavity and defining mutually orthogonal axes with each other and with the longitudinal axis of said post;
    (d) a pair of wooden beams each having a tongue insertable through a respective one of said cutaways;
    (e) said cutaways and tongues are substantially identical in cross-section to define a flush fit, said tongues each defining a retaining bore therein and including a retainer pin passing through each of said retaining bores and extending out of the respective one of said retaining bores at at least one end to bear against the wall of said coaxial bore to lock the respective tongue within said coaxial bore;
    (f) said tongues being tapered inwardly in a horizontal plane to define a right angular edge which is vertically extended, and said tongues and cutaways being dimensioned such that the ends of said tongues dovetail together within said coaxial bore to occupy half of same to define a semi-circular void in the remainder of said coaxial bore; and
    (g) a wooden cap dimensioned to fit within said coaxial bore adjacent the ends of said pins to prevent their dislodgement from their respective retaining bores and having a generally semi-circular plug depending into said semi-circular void to prevent the prying off of said cap and to further prevent the rotation of said cap within said bore, thus reducing the posibility of said cap becoming dislodged and freeing said pins.

* * * * *